United State

Folsom et al.

[11] 4,074,930
[45] Feb. 21, 1978

[54] COAXIAL OPTICAL SYSTEM

[75] Inventors: Gary J. Folsom; Francis J. Kaisler, both of Ellicott City, Md.

[73] Assignee: The United States of America as represented by the Secretary of the Air Force, Washington, D.C.

[21] Appl. No.: 652,956

[22] Filed: Jan. 28, 1976

[51] Int. Cl.² .............................................. G02B 27/00
[52] U.S. Cl. .................................. 350/33; 350/172; 350/236
[58] Field of Search .................. 350/33, 91, 172, 17, 350/236; 250/330, 333

[56] References Cited
U.S. PATENT DOCUMENTS

| 2,718,816 | 9/1955 | Loeck | 350/91 UX |
| 3,096,767 | 7/1963 | Gresser et al. | 350/236 X |

Primary Examiner—John K. Corbin
Assistant Examiner—Matthew W. Koren
Attorney, Agent, or Firm—Joseph E. Rusz; Henry S. Miller

[57] ABSTRACT

A system for allowing transmitter and receiver optical systems to utilize a common aperture and common optical elements simultaneously by introducing the transmitted beam into a small coaxial blind zone generated by an obscuration.

5 Claims, 4 Drawing Figures

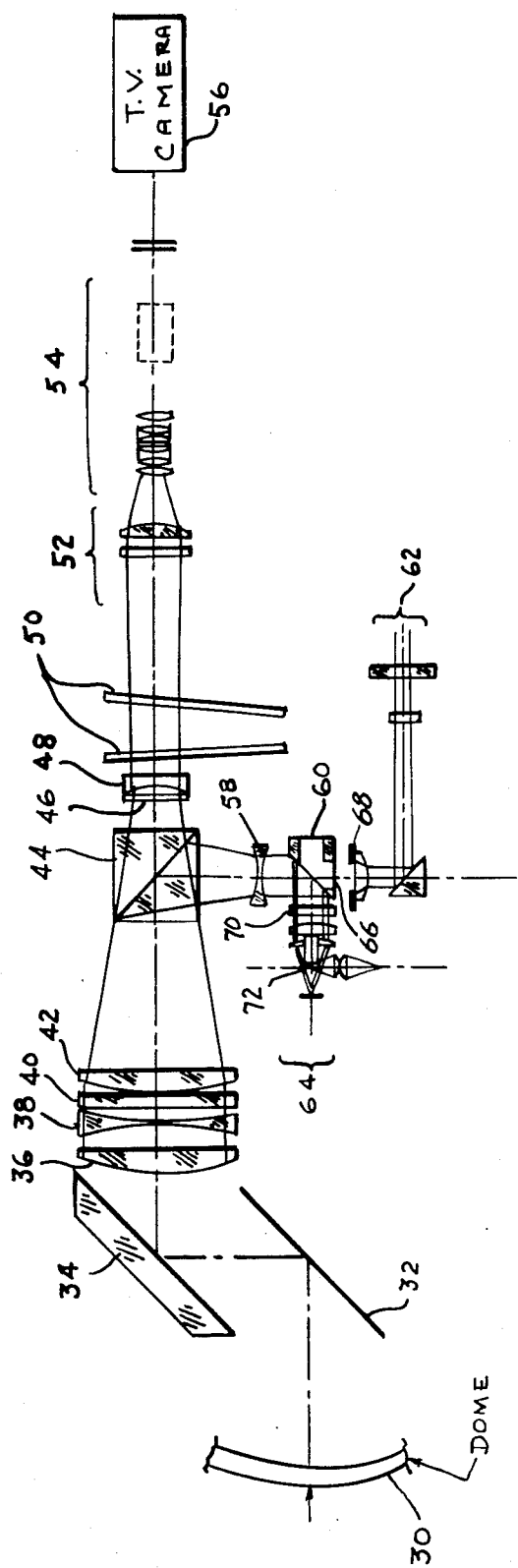

COAXIAL OPTICAL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical sighting systems and more particularly to such systems where a common aperture is simultaneously shared by a plurality of optical scanners.

Parameters which are given considerable attention in the design of multi-function airborne electro-optical systems are, package size and the alignment and stability of the optical axes. A large diameter package can adversely affect the aircraft performance while an error in alignment or stability reduces the performance of the electro-optical system.

The diameter, and to some extent, the length of an optical system is established based upon the required system performance parameters and the available sensor or illuminator parameters. Once these parameters have been selected, there is little that can be done to reduce the aperture or total volume of the optics for a single function. Volumetric efficiency of the optical system can, however, be improved for multi-function optical systems by allowing the subsystems to share common apertures and elements.

The need to share common elements is reinforced by the requirements for highly accurate line-of-sight stabilization and alignment. As a minimum, it is desirable to utilize a common line-of-sight stabilization and pointing gimbal in order to reduce the alignment errors contributed by this component to zero and to reduce volume and complexity by eliminating the necessity for duplicate gimbals. The use of a common gimbal implies a common window.

Improvements in the overall stability and maximum diameter can be gained by utilizing additional elements such as objective lenses, filters and relays depending on the application. The reduction in diameter also results in the reduced drag and buffeting in the air stream; this improves both aircraft performance capability and image stabilization.

Sharing of common apertures has long been a practice for microscopes which use a beamsplitter to provide illumination through the objective and for multispectral systems which use spectral beamsplitter or filter arrangements to generate images in different spectral bands formed by a common objective. However, in the case of optical systems which are designed to provide both far field scene illumination from high energy sources such as lasers and far field imaging at low signal levels, it has been standard practice to design physically separated optical subsystems for each function. This is done primarily to prevent field-of-view cross-over in the near field and thus to reduce the degrading effects of scatter from near field objects such as common windows, mirrors, lens elements, and the atmosphere.

SUMMARY OF THE INVENTION

The invention presented herein provides a system for allowing illuminator and imaging functions to utilize common apertures and optical components by blocking the scatter and reflections generated at common element interfaces. The design includes integration of scene illumination by visible, 0.85 micron, and 1.06 micron energy as well as scene viewing at the same wavelengths.

For most systems, the aperture required by the illumination system is much smaller than the diameter of the primary receiver aperture. Because the area of the aperture is of ultimate importance, and the area is proportional to the square of the radius, it is possible to obscure a small radius in the central zone of the large aperture without significantly affecting the total area. Alternately, a very small increase in the radius of the large aperture is required to compensate for the obscured area.

An object of the invention is to separate the fields of view of the illuminating and imaging functions in a coaxial rather than side by side configuration.

The separation is achieved by obscuring the central zone of the larger imaging optics and introducing the smaller illuminating beam into the resulting blind zone.

The package density is further increased by utilizing a spectral beamsplitter to separate the imaging and illumination functions at 1.06 from those in the visible and 0.85 spectrum. This approach allows the functions in both spectrums to utilize the full aperture of the optical system.

The blind zone is again used to separate fields of view in the same spectrum so that two functions for each spectrum utilize a single aperture.

Another object of the invention is to provide a new and improved multi-function airborne electro-optical system having high volumetric efficiency.

A further object of the invention is to provide a new and improved multi-function airborne electro-optical system that includes alignment and stability of the optical axis.

Still another object of the invention is to provide a new and improved multi-functional airborne electro-optical system that operates simultaneously at different wavelengths.

It is still a further object of the invention to provide a new and improved multi-functional airborne electro-optical system that allows subsystems to share common apertures and elements.

It is another object of the invention to provide a new and improved multi-functional airborne electro-optical system that is less complex and more easily maintained than known similar systems.

It is another object of the invention to provide a new and improved multi-functional airborne electro-optical system that may be constructed at a cost less than prior art devices.

These and other advantages, features and objects of the invention will become more apparent from the following description taken in connection with the embodiments in the accompanying drawings.

DESCRIPTION OF THE DRAWINGS

FIG. 2 is a schematic representation of the system of the invention.

DESCRIPTION OF THE PREFERRED EMBODIMENT

Figure 1:
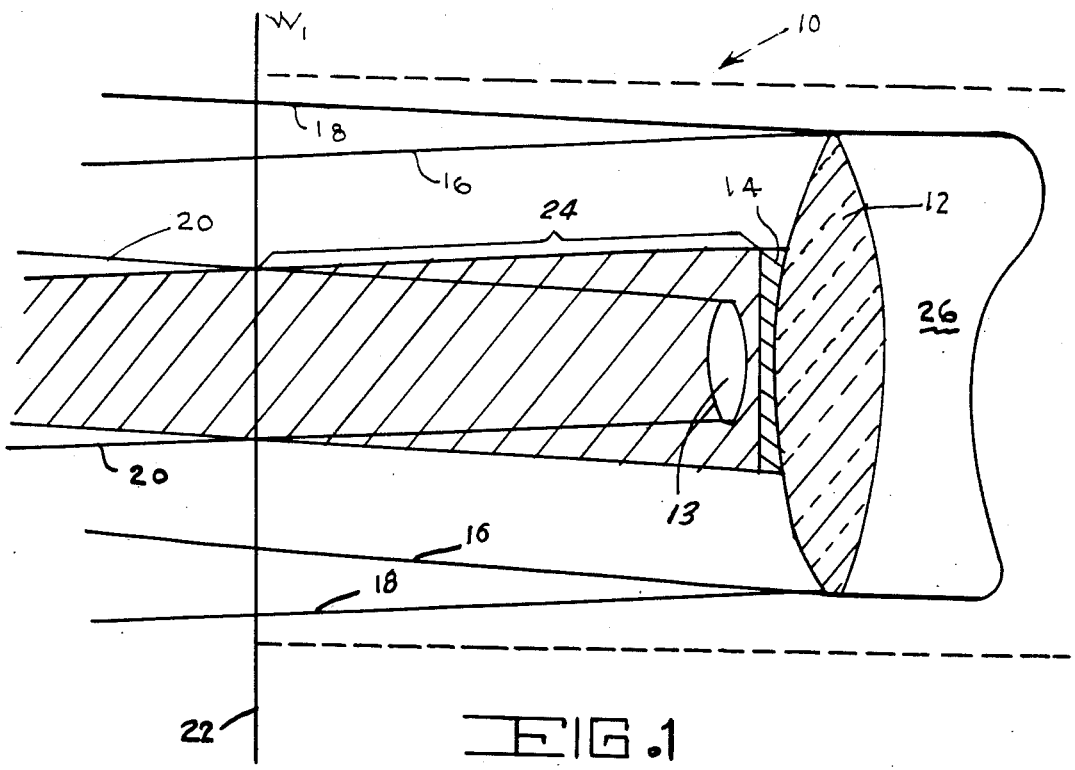
FIG. 1 is a schematic representation of the invention.

FIG. 1 shows a typical lens system incorporating the invention. The optics would be enclosed in a housing generally represented by the dashed lines 10. Imaging optics are represented by the lens 12 illuminating optics are represented by lens 13. A central obscuration 14 is located in the aperture of the imaging optics 12 and is sufficiently large to preclude the intersection of fields of view represented by lines 16 and 18 prior to exiting through the final common element window 22. Lines 20 represent illuminating radiation. The reflected and scattered energy of all elements between window 22 and obscuration 14 and shown representatively by shaded region 24, is therefore blocked from imaging in the receiver sensor 26.

FIG. 2 shows the optical schematic of a system which utilizes obscuration and beamsplitting techniques. The system receives imaging from available light which is directed through the system to a television camera, while a laser illuminating and imaging system shares many of the same components.

Elements common to both system include protective dome 30, the window through which radiation enters the system. The gimbal mirror 32 reflects radiation to element 34 where radiation passes through the objective lens area and elements 36, 38, 40 and 42. The beam splitter 44 separates visible television energy from 1.06 micron laser functions. Elements 46, 48, 50 and elements of the field and relay lenses 52 and 54 respectively are now unique and utilized solely by television imaging system 56.

Elements 58 and 60 are common to laser transmitter 62 and laser receiver 64. The aperture 66 in mirror element 60, aperture stop 68 and the obscuration 70 effectively isolate the high energy laser beam from the laser receiver 64 field of view. Mirror element 72 serves the dual purpose of reflecting a test signal to the laser receiver path and providing additional obscuration of the scatter and reflections from the transmitted laser beam.

Figure 3:
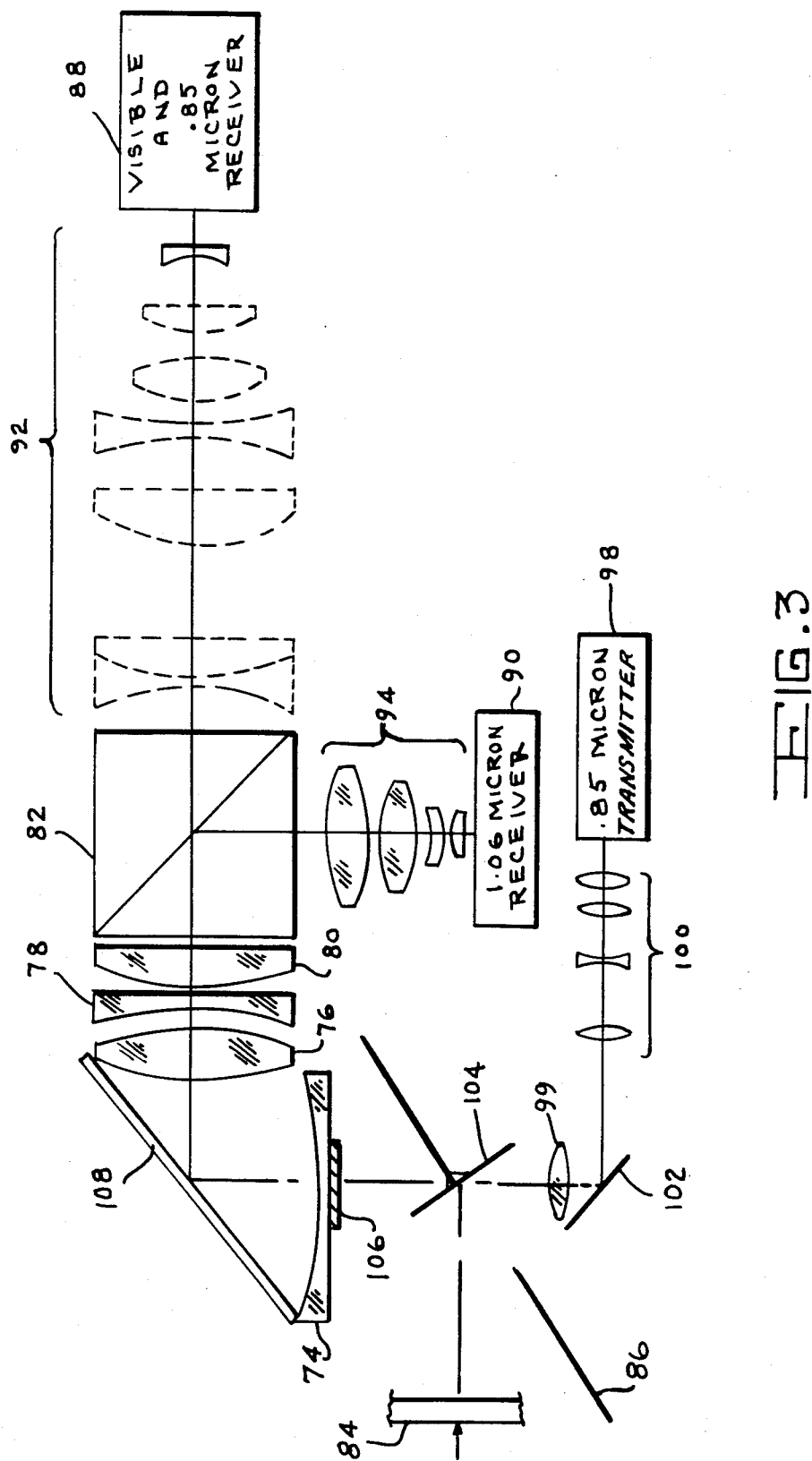
FIG. 3 is a schematic representation of an alternative system embodiying the invention.

An alternative embodiment is shown in FIG. 3 where a GaAs laser illuminator is substituted for the 1.06 micron laser designator. Here lens elements 74, 76, 78 and 80, beam splitter 82, as well as window 84 and mirror 86, are common to both 0.85 micron and visible low light television sensor image 88 and to the 1.06 micron laser tracker image 90. Lens elements 92 provide zoom and imaging functions for the television sensor only, while elements 94 operate on the laser tracker image. Obscuration 106 is provided on lens element 74.

Coaxial integration of the GaAs illuminator in this design is achieved by projecting the image formed by transmitter 98 through lens system 100 and mirror 102 on to mirror 104 and window 84. Mirror 104 is rigidly attached orthogonal to mirror 86 and, in addition to integrating illuminator 98 into the primary aperture, serves as the obscuration in conjunction with 106 which generates the required blind zone for the low light television sensor.

Figure 4:
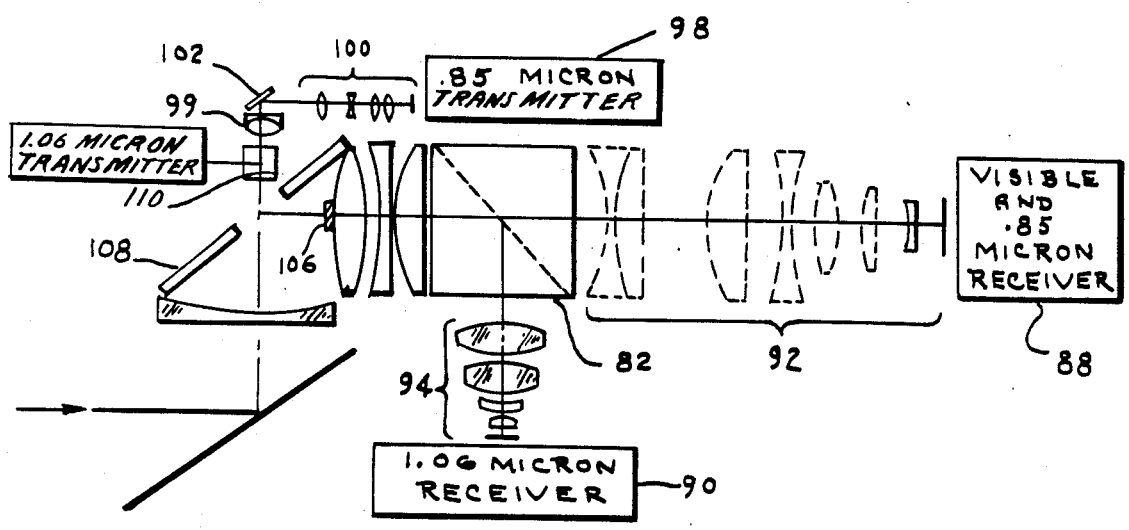
FIG. 4 is a schematic representation of another alternative system embodying the invention.

FIG. 4 provides an alternate design eliminating the mirror 104 from FIG. 3 and provides coaxial integration of various functions through a hole in mirror 108. The hole in mirror 108 in conjunction with the relocated obscuration 106 generates the required blind zone for separation of illuminator 98 and receiver 90 fields of view. Here it is possible to integrate both the 1.06 micron and 0.85 micron laser illuminator functions coaxially into the same blind zone by locating beam-splitter 110 behind the hole in mirror 108. The elements for the imaging functions are identical to those for FIG. 3.

Although the invention has been described with reference to particular embodiments, it will be understood to those skilled in the art that the invention is capable of a variety of alternative embodiments within the spirit and scope of the appended claims.

What is claimed is:

1. A coaxial optical system for transmitter and receiver optical systems utilizing a common aperture and optical elements comprising: an enclosure; a first image receiving means for receiving radiation of designated wavelengths located along an axis within the enclosure; a second image receiving means for receiving radiation of designated wavelengths different from said first image receiving means located along an axis at an angle thereto, within the enclosure; means for generating radiation compatable with said second image receiving means located along an axis transverse to the axis thereof, within said enclosure; a first lens system including an aperture for collecting radiation and focusing an image at said first image receiving means; means located in said lens system for obscuring an area along the axis thereof; a second lens system including a beam splitting means located along the axis of the second image receiving means and adapted to cooperate with said first lens system whereby radiation transmitted and received utilizes the area of obscuration in the said first lens system.

2. A coaxial optical system for transmitter and receiver optical systems according to claim 1 wherein: said first image receiver means receives radiation having a wavelength of 0.85 microns.

3. A coaxial optical system for transmitter and receiver optical systems according to claim 2 wherein said second image receiver means receiving radiation having a wavelength of 1.06 microns.

4. A coaxial optical system for transmitter and receiver optical systems according to claim 1 wherein: said second image receiving means is located on an axis transverse to the axis of the first lens system.

5. A coaxial optical system for transmitter and receiver optical systems according to claim 1 wherein said second image receiving means is located on an axis parallel to the axis of the first lens system.

* * * * *